(12) United States Patent
Nudler

(10) Patent No.: US 7,975,024 B2
(45) Date of Patent: Jul. 5, 2011

(54) VIRTUAL PERSONAL COMPUTER ACCESS OVER MULTIPLE NETWORK SITES

(76) Inventor: Yakov Nudler, Rehovot (IL)

( * ) Notice: Subject to any disclaimer, the term of this patent is extended or adjusted under 35 U.S.C. 154(b) by 673 days.

(21) Appl. No.: 11/674,837

(22) Filed: Feb. 14, 2007

(65) Prior Publication Data

US 2008/0195760 A1    Aug. 14, 2008

(51) Int. Cl.
*G06F 15/16* (2006.01)
*G06F 7/00* (2006.01)
*G06F 17/00* (2006.01)

(52) U.S. Cl. .................. 709/218; 709/219; 707/640

(58) Field of Classification Search .......... 709/201–203, 709/217–218, 223–224; 340/252; 714/39, 714/47
See application file for complete search history.

(56) References Cited

U.S. PATENT DOCUMENTS

| | | | |
|---|---|---|---|
| 7,266,715 B1 * | 9/2007 | Bazzinotti et al. ................ 714/4 |
| 7,283,465 B2 * | 10/2007 | Zelig et al. .................... 370/219 |
| 7,451,220 B1 * | 11/2008 | Dalgic et al. .................. 709/225 |
| 2004/0243650 A1 * | 12/2004 | McCrory et al. .............. 707/203 |
| 2006/0179218 A1 * | 8/2006 | Burkey ......................... 711/114 |
| 2007/0180449 A1 * | 8/2007 | Croft et al. ....................... 718/1 |
| 2007/0198709 A1 * | 8/2007 | Hawkinson et al. .......... 709/224 |
| 2008/0072000 A1 * | 3/2008 | Osaki et al. ................... 711/162 |
| 2008/0089347 A1 * | 4/2008 | Phillipi et al. ................ 370/400 |

* cited by examiner

*Primary Examiner* — Joseph E Avellino
*Assistant Examiner* — James Baron
(74) *Attorney, Agent, or Firm* — Mark M. Friedman

(57) ABSTRACT

A computer system in a wide area network, including a workstation computer and a first virtualization server which maintains virtualization information in real time for the workstation computer on a first storage device, wherein the first virtualization server is located at a first site. A second virtualization server is located at a second site in the wide area network. At the first site, a first gateway computer is operatively connected to a first synchronization computer and at the second site, a second gateway computer is operatively connected to a second synchronization computer. A copy of the virtualization information of the workstation computer is maintained in real time on a second storage device at the second site, by intercommunicating between the first synchronization computer and the second synchronization computer.

6 Claims, 8 Drawing Sheets

VIRTUAL PERSONAL COMPUTER ACCESS OVER MULTIPLE NETWORK SITES

CROSS REFERENCE TO RELATED APPLICATIONS

N/A

FIELD AND BACKGROUND OF THE INVENTION

The present invention relates to computer platform virtualization and, more particularly, a system and method for accessing operationally identical virtual computers at multiple network sites. Specifically, the method performs synchronization between the multiple network sites of all information necessary for virtualizing a client computer or client network at the multiple network sites.

Currently, the most commonly employed method of transferring data over the Internet is to employ the World Wide Web environment, also called simply "the Web". In the Web environment, servers and clients effect data transaction using the Hypertext Transfer Protocol (HTTP), a known protocol for handling the transfer of various data files (e g, text, still graphic images, audio, motion video). Information is formatted for presentation to a user by a standard page description language, the Hypertext Markup Language (HTML). In addition to basic presentation formatting, HTML allows developers to specify "links" to other web resources identified by a Uniform Resource Locater (URL). An URL, is a special syntax identifier defining a communications path to specific information. Each logical block of information accessible to a client, called a "page" or a "Web page", is identified by the URL. The URL provides a universal, consistent method for finding and accessing information by the Web "browser" Retrieval of information on the Web is generally accomplished with an HTML-compatible browser by submitting a request at the client machine, e.g. personal computers (PC) or workstation computers for information identified by a URL. When a user desires to retrieve a page, a request is submitted to a server connected to a client computer at which the user is located and may be handled by a series of servers to effect retrieval of the requested information. The information is provided to the client formatted according to HTML.

A virtual platform is a software emulation of a computer system installed as a software application in a host computer. The virtual platform contains the main building blocks of the computer system, one or more processors, peripherals such as Ethernet and USB, and storage such as memory and disks. When the virtual platform is configured to emulate a workstation computer, an end user runs software applications on the virtual platform installed on the host computer identically to or at least in much the same way as on the workstation computer.

An example of a commercial virtual platform is a virtual machine as offered by VMware Inc. (Palo Alto, Calif.). The VMware virtual machine is an x86-based personal computer with a number of highly standardized components, such as USB 1.1 and 2.0, Ethernet controller, ATA disk drives, and VGA graphics. Performance of the virtual system, is typically within 50%-75% of performance of the host computer hosting the virtual system.

Tunneling is the transmission of data through a public network in such a way that routing nodes in the public network are unaware that the transmission is part of a private network. Tunneling is generally done by encapsulating the private network data and protocol information within the public network protocol data so that the tunneled data is not available to anyone examining the transmitted data frames. Tunneling allows the use of public networks (e.g., the Internet), to carry data on behalf of users as though they had access to a 'private network', hence the name.

Transport Layer Security (TLS) and its predecessor, Secure Sockets Layer (SSL), are cryptographic protocols which provide secure communications on the Internet for such things as web browsing, e-mail, Internet faxing, and other data transfers. There are slight differences between SSL 3.0 and TLS 1.0, but the protocol remains substantially the same.

TLS runs on layers beneath application protocols such as HTTP, FTP, SMTP and NNTP, and above the TCP or UDP transport protocol, which form part of the TCP/IP protocol suite. While it can add security to any protocol that uses reliable connections (such as TCP), it is most commonly used with HTTP to form HTTPS HTTPS is used to secure World Wide Web pages for applications such as electronic commerce. SMTP is also an area in which TLS has been growing and is specified in RFC 3207. These applications use public key certificates to verify the identity of endpoints.

TLS can also be used to tunnel an entire network stack to create a VPN, as is the case with OpenVPN. Many vendors now marry TLS's encryption and authentication capabilities with authorization. There has also been substantial development since the late 1990s in creating client technology outside of the browser to enable support for client/server applications. When compared against traditional IPSec VPN technologies, TLS has some inherent advantages in firewall and NAT traversal that make it easier to administer for large remote access populations. Vendors like Arkoon, Aventail, F5 Networks, Juniper, and others have been developing in this space for some time.

Secure VPNs use cryptographic tunneling protocols to provide the intended confidentiality (blocking snooping and thus Packet sniffing), sender authentication (blocking identity spoofing), and message integrity (blocking message alteration) to achieve privacy. When properly chosen, implemented, and used, such techniques can provide secure communications over unsecured networks.

Reference is now made to FIG. 1 (prior art) illustrating conventional access to a virtual system over the Internet through a network 10. Network 10 includes access to an application server 109 in a local area network (LAN) through a firewall 111 and gateway computer 101. A virtual machine emulating workstation computer 113 is installed in virtualization server 105. The virtual machine is built by accessing and copying detailed system information and user data from workstation computer 113 and storing the virtualization information at virtualization server 105 or storage device 107 accessible by virtualization server 105. The virtual machine emulating workstation computer 113 is accessible using an HTML browser, for instance from another computer, e.g. portable computer 1010 or another application installed on computer 1010. The pages provided by virtualization server 105 to computer 1010 are an emulation or virtualization of the behavior of desktop while working with workstation computer 113.

SUMMARY OF THE INVENTION

The term "failure" or "communications failure" are used herein interchangeably and in the context of the present invention refers to a failure to synchronize virtualization information between one or more sites, independent of the cause of the failure.

Prior art network 10 does not provide for a communications failure between client computer 1010 and virtualization server 105. Hence a user of client computer 1010 may be in the middle of a session and if a failure occurs in any of firewall 111, gateway 101, router 103 and/or virtualization server 105, or another communications failure occurs between client computer 1010 and virtualization server 105, the user session is abruptly discontinued and user data may be irretrievably lost or corrupted.

Thus there is a need for and it would be highly advantageous to have a method for accessing operationally identical virtual computers at multiple network sites.

According to the present invention there is provided a method, in a wide area network including a workstation computer and a first virtualization server which maintains virtualization information in real time for the workstation computer on a first storage device. The first virtualization server is located at a first site in the wide area network. A second virtualization server is located at a second site in the wide area network. At each of the first and second sites respectively a first gateway computer is operatively connected to a first synchronization computer and a second gateway computer is operatively connected to a second synchronization computer. First, a user of the client application typically logs in using the workstation computer at an available site with the first or second gateway applications. Logging in to the first gateway application operatively connects the client application to the first virtualization server and logging in to the second gateway application operatively connects the client application to the second virtualization server. A copy of the virtualization information of the workstation computer is maintained in real time on a second storage device at the second site by communicating through the first and second gateway computers. The maintenance of the virtualization information is preferably performed by intercommunicating between the first synchronization computer and the second synchronization computer. When a client application runs in a client computer connected to the wide area network, and the client application is operatively attached to the first virtualization server, a virtualization session of the workstation computer is provided to a user of the client computer. Monitoring is performed for a communications failure between the first site and the second site, the failure typically causing a discrepancy between the virtualization information and the copy. Upon detecting the communications failure in the first site and/or an error in the virtualization information, the client application is switched to operatively connect to the second virtualization server at the second site. The second virtualization server continues the virtualization session using the copy of the virtualization information. Upon the detection of the communications failure to/from/in the first site, a third virtualization server is activated by copying the virtualization information to a third storage device at a third site. The third site includes a third gateway computer which operatively connects the wide area network to a third synchronization computer. The intercommunication includes updating the copy based on user activity by intercepting a connection of the virtualization session, reading update information from the connection and redirecting the update information to the second site. Alternatively, the intercommunication includes updating the copy based solely on user activity by copying solely a portion of the virtualization information stored on the first storage device to the copy stored on the second storage device. Alternatively, the intercommunication includes spoofing a user of the client application based on activity of the user.

A third virtualization server functionally identical to the first and second virtualization servers is preferably located at a third site in the wide area network. At the third site a third gateway computer operatively connects the wide area network to a third synchronization computer. A second copy of the virtualization information is maintained on a third storage device at the third site. The maintenance of the second copy is performed by intercommunicating between the third synchronization computer and at least one of the first and second synchronization computers.

The first site, the second site and the third site form a first virtualization node in the wide area network, and a second virtualization node functionally identical to the first virtualization node is preferably available in the network. The second visualization node includes a fourth, a fifth and a sixth site of the wide area network Monitoring for failure is performed in the first node and upon detecting a failure in at least two of the three sites of the first virtualization node, the virtualization information is copied of the workstation computer to a storage device in the second virtualization node.

According to the present invention there is provided a computer system in a wide area network, including a workstation computer and a first virtualization server which maintains virtualization information in real time for the workstation computer on a first storage device, wherein the first virtualization server is located at a first site.

A second virtualization server is located at a second site in the wide area network. At the first site, a first gateway computer is operatively connected to a first synchronization computer and at the second site, a second gateway computer is operatively connected to a second synchronization computer. A copy of the virtualization information of the workstation computer is maintained in real time on a second storage device at the second site, by intercommunicating between the first synchronization computer and the second synchronization computer. A third virtualization server is preferably located at a third site in the wide area network. The third virtualization server is functionally identical to the first and second virtualization servers. At the third site a third gateway computer operatively connects the wide area network to a third synchronization computer. A second copy is maintained in real time of the virtualization information on a third storage device at the third site by intercommunicating between the third synchronization computer and at least one of the first and second synchronization computers. The first site, the second site and the third site form a first virtualization node in the wide area network. A second virtualization node functionally identical to the first virtualization node is preferably available, the second virtualization node at a fourth, fifth and sixth sites of the wide area network. Monitoring for a failure is performed and upon detecting a failure in at least two of the three sites of the first virtualization node, the virtualization information of the workstation computer is copied to a storage device in the second virtualization node.

According to the present invention there is provided, a computer readable medium readable by a computer in a wide area network including a workstation computer and a first virtualization server which maintains virtualization information in real time for the workstation computer on a first storage device. The first virtualization server is located at a first site. A second virtualization server is located at a second site in the wide area network. At the first site, a first gateway computer is operatively connected to a first synchronization computer and at the second site, a second gateway computer is operatively connected to a second synchronization computer. The computer readable medium tangibly embodies a program of instructions executable by the computer for maintaining in real time a copy of the virtualization information of the workstation computer on a second storage device at the second site by communicating through the first and the second gateway computers.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
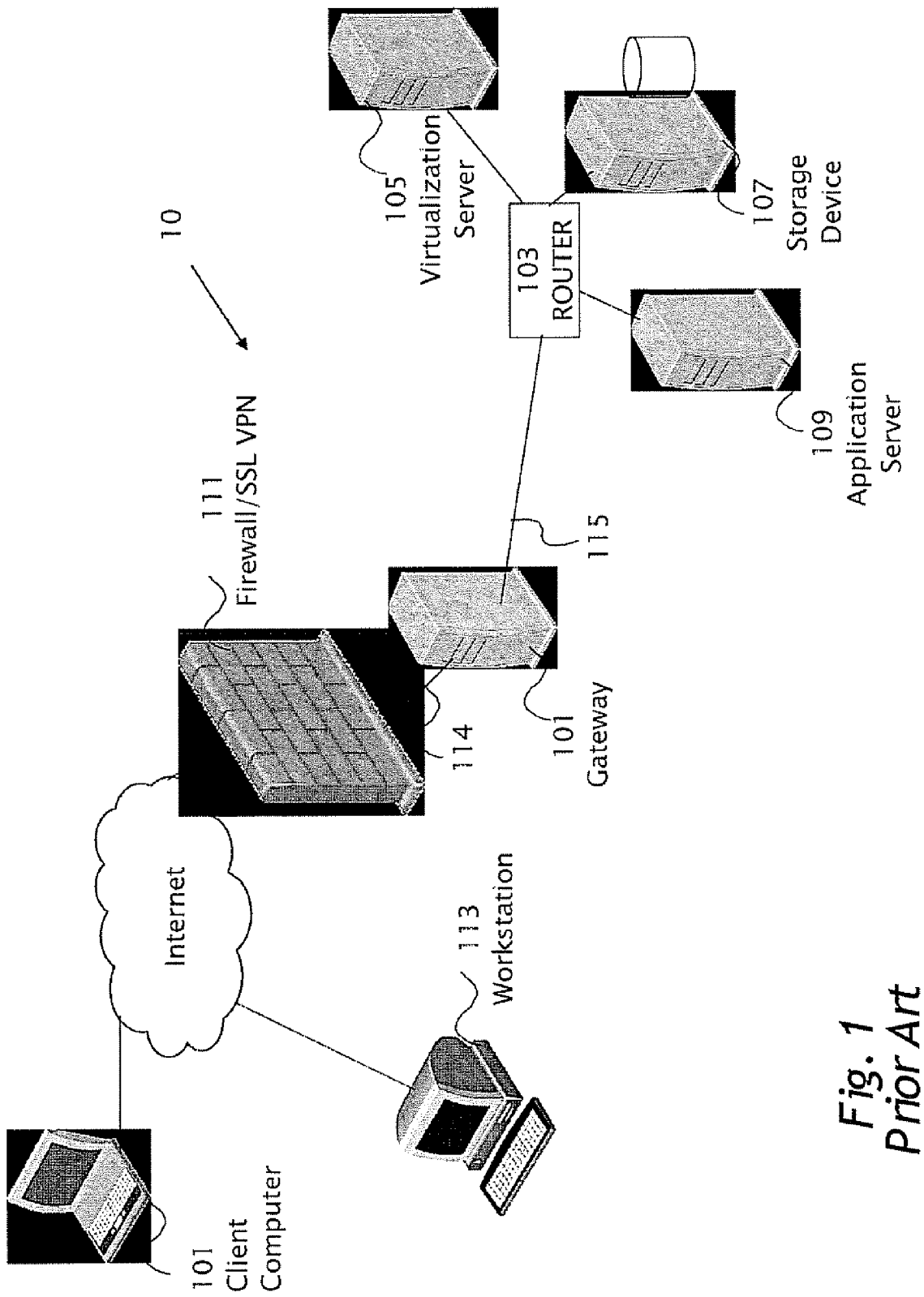
FIG. 1 is a prior art drawing of a conventional wide area network.

The present invention is of a system and method of accessing operatively identical virtual computers at multiple network sites. Specifically, the method performs synchronization between the multiple network sites of all information necessary for virtualizing a client computer or client network at the multiple network sites. The present invention allows access by a user using a personal computer equipped with a client application, e.g. Internet browser, to access a virtual machine of another, e.g. home desktop computer at two or more different sites typically located in two physically different locations. The Internet browser allows the user to access the two or more virtual machines. The user selects one of the virtual machines to use and the two or more other virtual machines are updated in real time during the user session, so that upon communications failure to the selected virtual machine, the user may switch to one of the other available virtual machines to continue the session.

The principles and operation of a system and method of accessing operatively identical virtual computers at multiple network sites, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computers system" is defined as one or more software modules, one or more hardware modules, or combinations thereof which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including mobile telephones, PDA's, pagers, hand-held devices, laptop computers, personal computers, multi-processor systems, microprocessor-based or programmable consumer electronics, network PCs, minicomputers, mainframe computers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Figure 2:
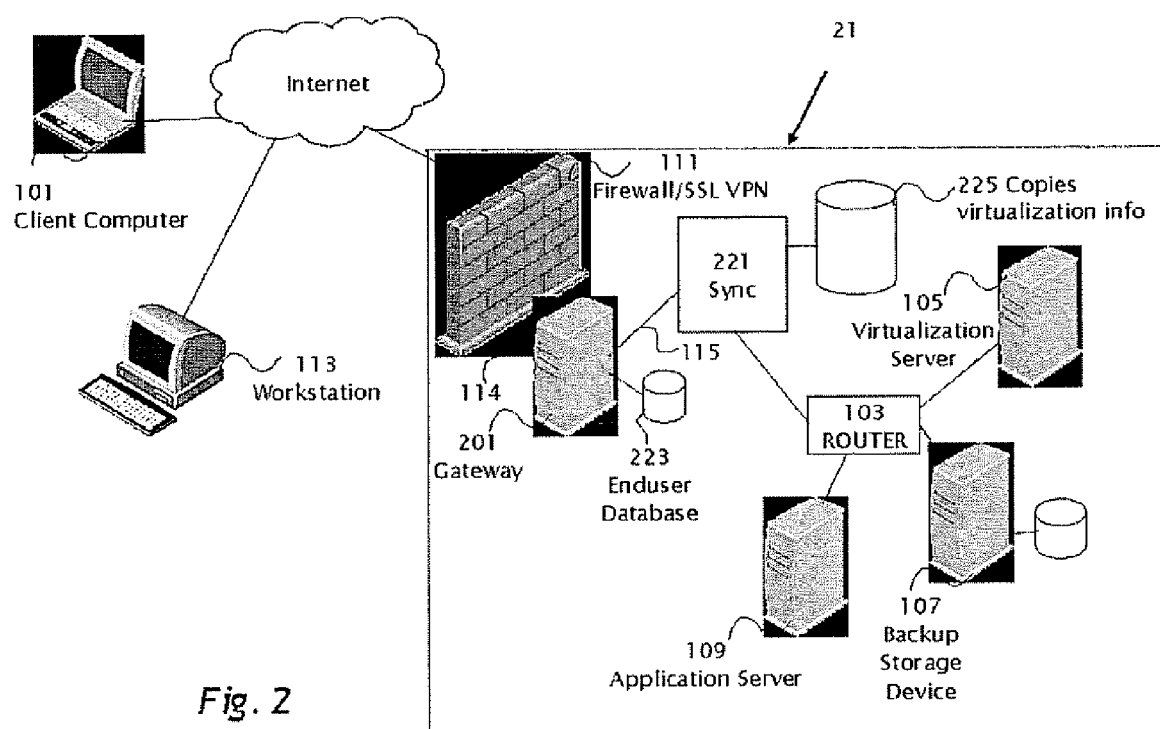
FIG. 2 is a system drawing, according to an embodiment of the present invention.
Figure 3:
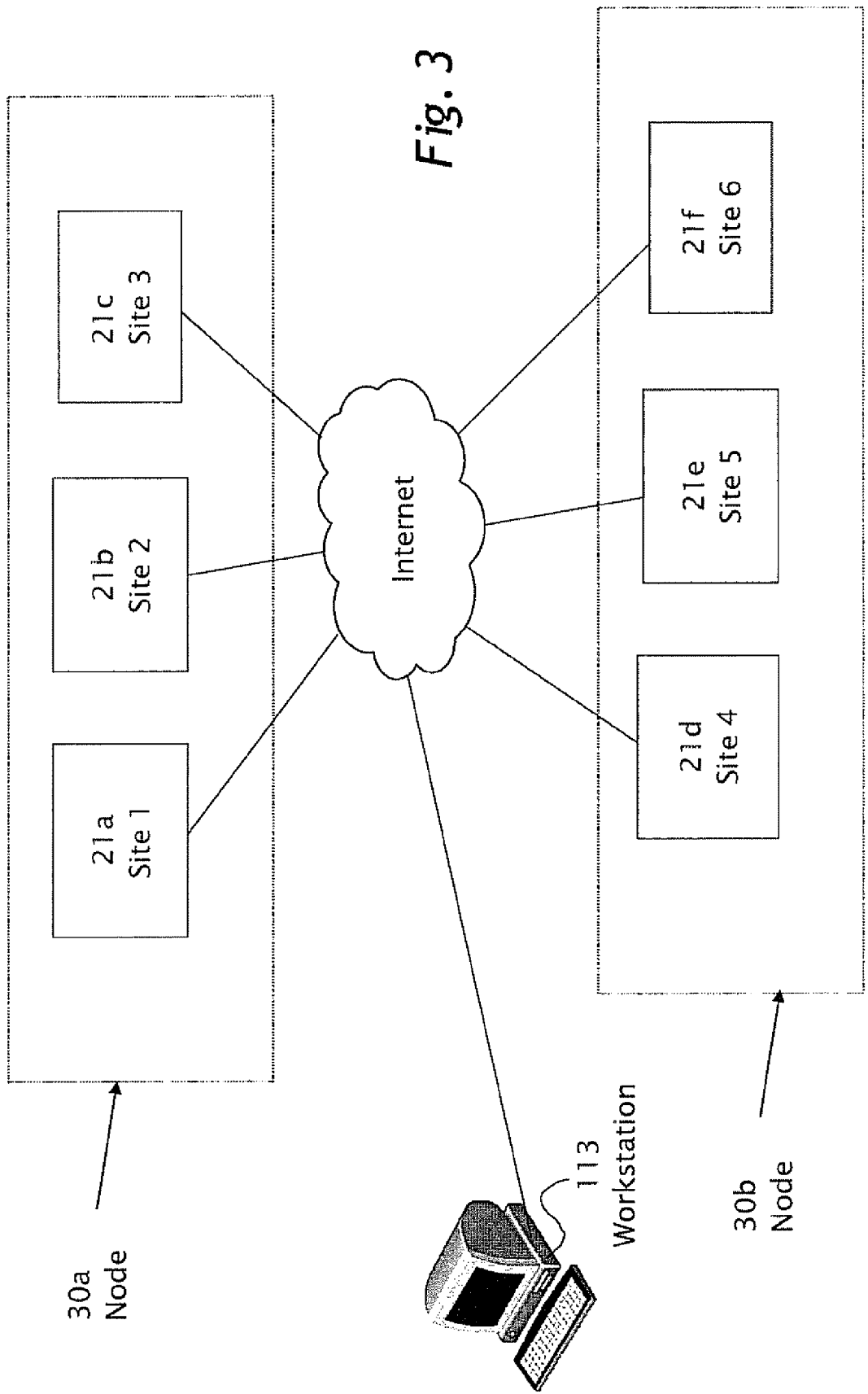
FIG. 3 is another system drawing, which illustrates scalability of the present invention.

Referring now to the drawings, FIG. 2 illustrates, a site 21 of network 10. Site 21 includes a synchronization computer 221 which operates, according to embodiments of the present invention to copy virtual machine information stored at site 21 to other similar network sites 21 at different physical locations. Reference is now also made to FIG. 3, illustrating two nodes 30a and 30b, according to embodiments of the present invention. Node 30a includes sites 21a, 21b and 21c, whereas node 30b includes sites 21d, 21e and 21f. Virtual machines installed at the one or more other sites 21 may use the stored virtualization information to provide virtualization of workstation computer 113 at any time.

Figure 4:
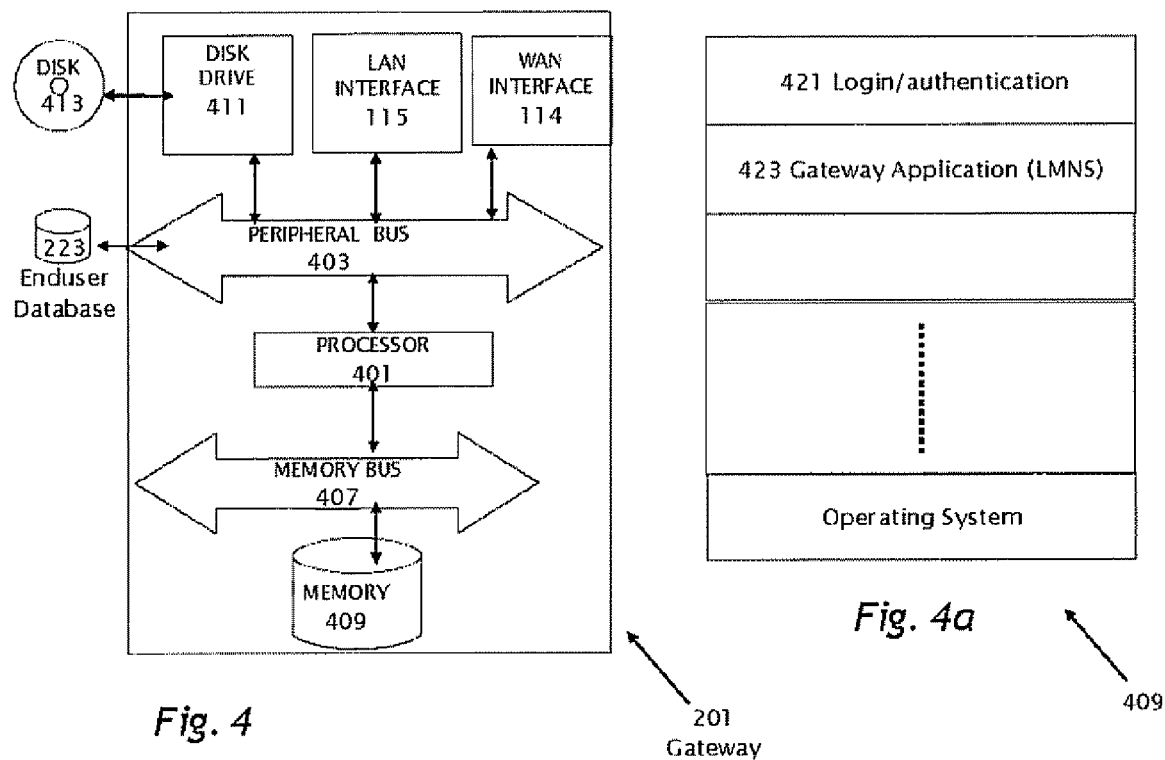
FIG. 4 is a simplified block diagram of a gateway computer, according to an embodiment of the present invention.
Figure 5:
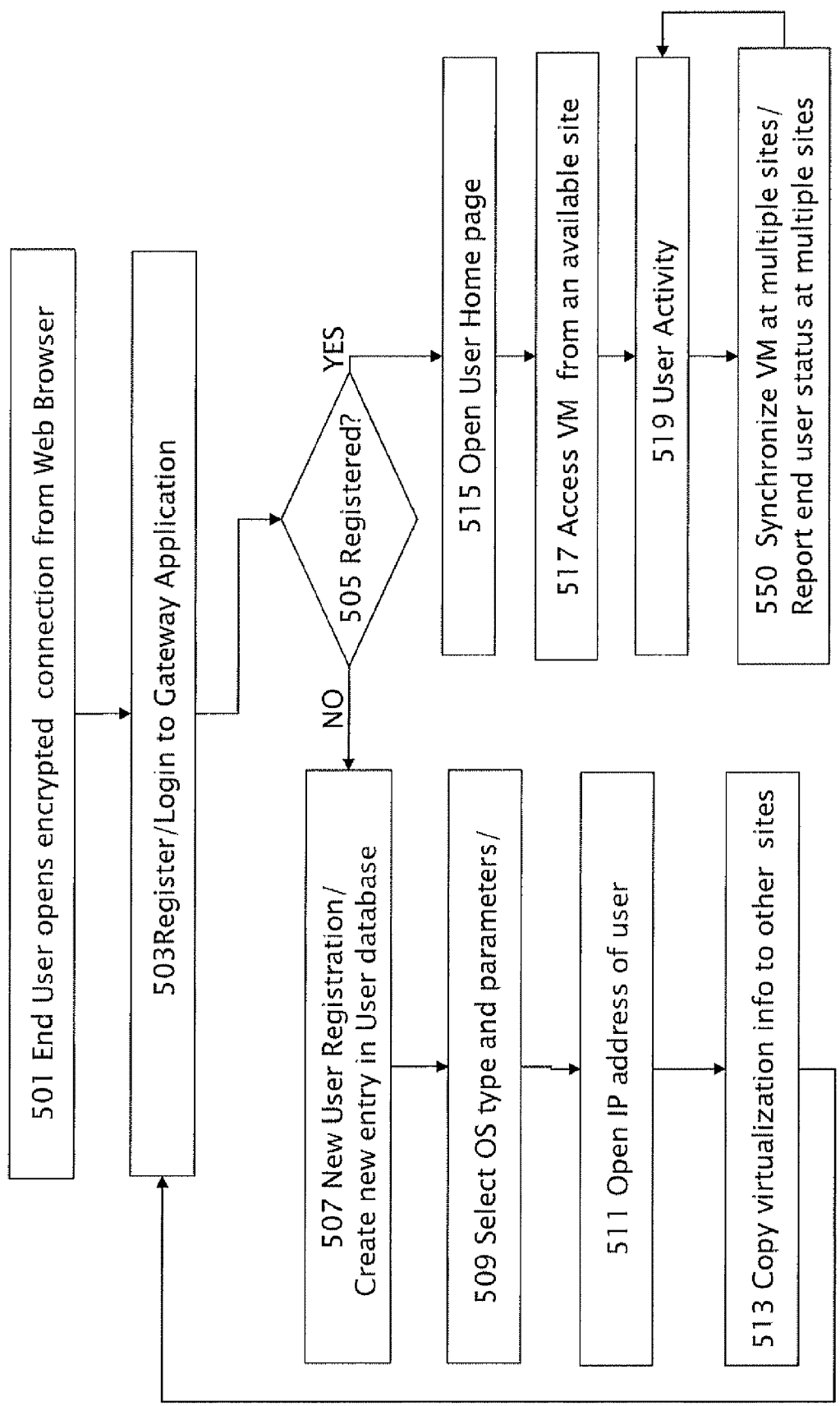
FIG. 5-FIG. 8 are simplified flow charts which illustrate operation of embodiments of the present invention.

Reference is now made to FIG. 4 which illustrates a computer, for instance gateway 201, according to the present invention. Gateway 201, includes a processor, a storage mechanism including a memory bus 407 to store information in memory 409 and a WAN interface 114 and LAN interface 115, each operatively connected to processor 401 with a peripheral bus 403. Gateway 201 further includes a data input mechanism, e.g. disk drive 411 from a program storage device or computer readable medium 413, e.g. optical disk. Data input mechanism 411 is operatively connected to processor 401 with a peripheral bus 403 An end user data base 223, is attached to peripheral bus 403 which stores end user information of subscribers of the service, according to embodiments of the present invention. A gateway application is installed in memory 409 of gateway computer 201. FIG. 4a illustrates a simplified map of memory 409, during operation of the present invention. Memory 409 includes a portion 421 of memory storing procedures for login and authentication of end users of the present invention and a gateway application which operates to copy and maintain virtualization information in multiple network sites 21, according to embodiments of the present invention.

Although the present invention is described in terms of operation being shared between gateway computer 201 and synchronization computer 221 at each site 21, equivalent embodiments may be configured using a single gateway computer or by dividing the functionality of the present invention in a different manner between gateway computer 201 and synchronization computer 221. Similarly, the manner of connecting computers 201, 221 and router 103 at each site 21 may differ in different embodiments of the present invention.

Figure 6:
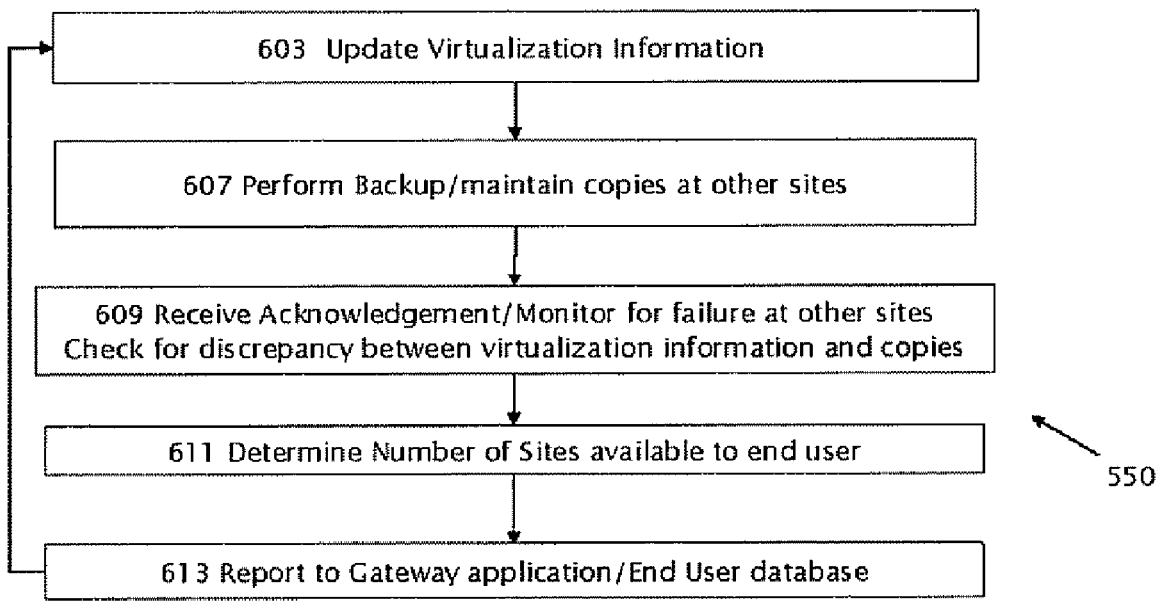

Reference is now made to FIGS. 5-8 which illustrate operation of the present invention. In step 501 of FIG. 5, an end user operating workstation computer 113 opens a connection, preferably an encrypted connection from a Web browser on client computer 1010 to gateway computer 201. In step 503, end user either registers for the first time or logs in to a service of the present invention. In decision block 505, if the end user is not already registered then a new user registration procedure is performed (step 507) and a new entry is opened in end user data base 223. The user selects (step 509) virtual machine parameters, such as virtual machine operating system. An IP address of the end user is opened (step 511), corresponding to IP address of workstation computer 113 and virtualization information is copied (step 513) from work station computer to two or more sites 21. In decision block 505, if the end user is already registered, the login procedure opens (step 515) a home page of the end user, typically corresponding to the desktop of workstation computer 113, access (step 517) to a virtual machine at an available site 21. The end user typically selects a virtual machine at one of the available sites, for instance site 21a. The end user remotely operates (step 519) the virtual machine, user activity information is synchronized (step 550) and end user status is reported among all other available sites 21b and 21c. FIG. 6 illustrates step 550 in more detail In step 603, virtualization information is updated at sites 21a and 21b based on the user activity with sites 21a. In step 607, backup is performed to other sites 21b and 21c so that a backup copy of updated virtualization information is maintained at one or more other sites 21b and 21c. In step 609, an acknowledgment is received from the one or more other sites 21b and 21c that the virtualization information has been successfully updated Alternatively other means for monitoring for a backup failure are used to verify that successful backup has occurred and a failure has not occurred at any of backup sites 21b and 21c. A comparison of a virtualization information at primary site 21a and backup sites 21b may be performed through the use of comparison of a redundancy check of the different copies of virtualization information between sites 21. If a failure to update/backup occurs, the number of available sites for virtualization of workstation computer 113 is provided (step 613) to gateway application 423, end user database 423 is updated accordingly that one more sites 21 are now unavailable for use due to a communications or other failure.

Figure 7:
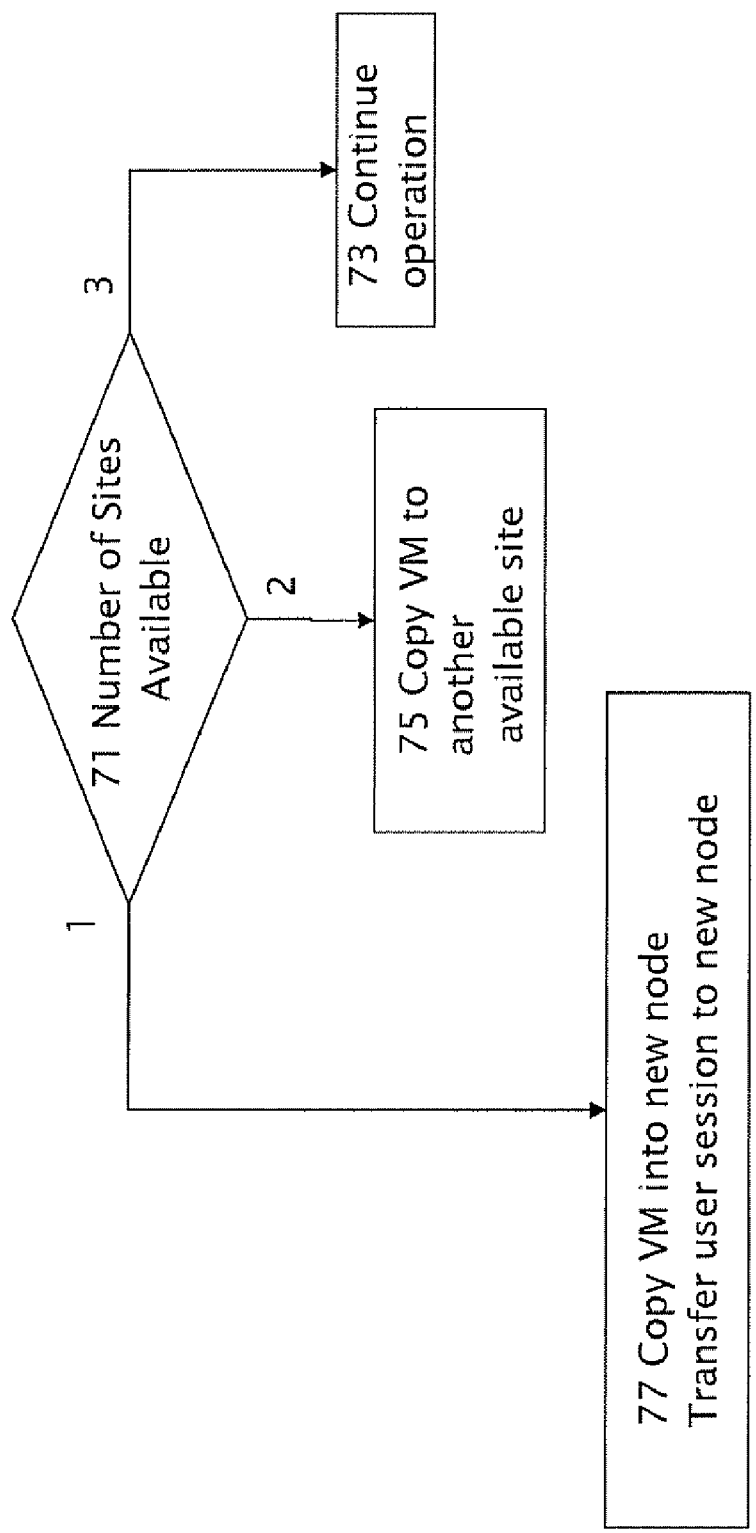

FIG. 7 illustrates a "failsafe" mechanism, according to an embodiment of the present invention. In decision block 71, if the number of sites 21 available for virtualization of workstation computer 113 is three or more than operation continues. Otherwise, if only two identical virtual machines are available and properly updated for virtualization of work station computer 113, then gateway application 423 communicates with gateway applications 423 at other sites 21 to find an alternate third available site 21 and the virtualization information is copied (step 75) to the other site 21 If only one site 21 is available, the virtualization information of workstation computer 113 is preferably copied (step 77) into another node 30 (including three or more sites 21).

Figure 8:
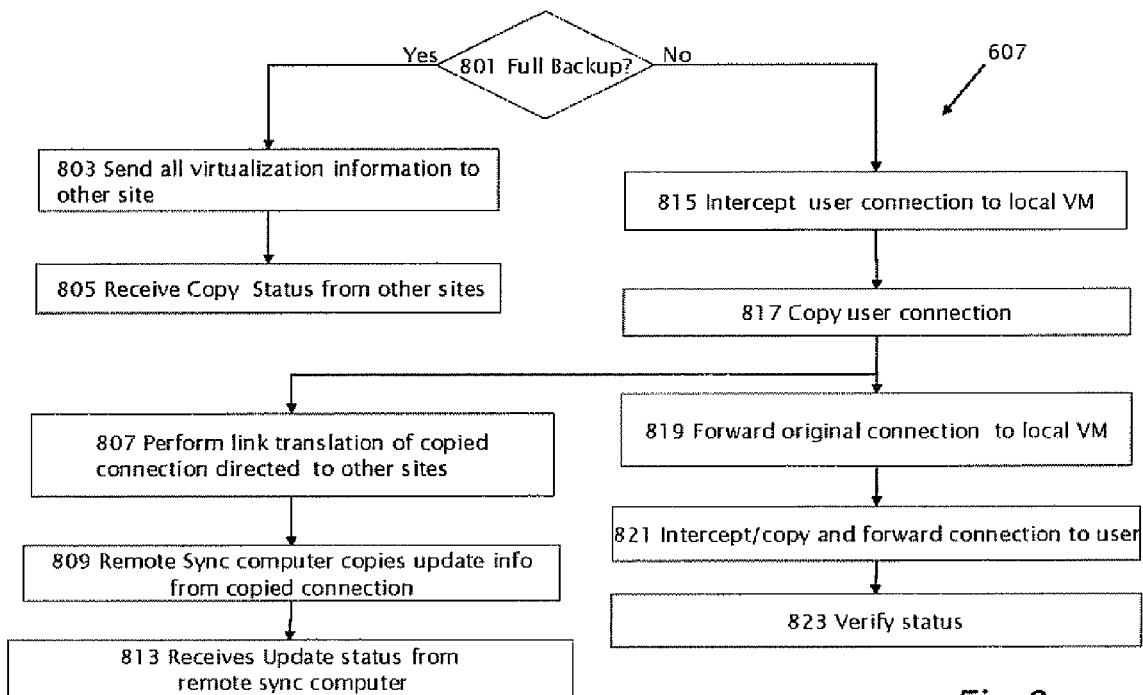

FIG. 8 illustrates, according to an embodiment of the present invention backup and synchronization (step 607). In decision block 801, a decision is made typically within gateway application 423 if a full backup of all virtualization is required or an update. A full backup is required for instance to copy virtualization information into a new site 21 upon determining a failure in one of sites 21. In the case of full backup, all virtualization information is transmitted (step 803) to another site 21, and status of the copy is received (step 805) from the other site, preferably in the form of a redundancy check. Alternatively, if a partial backup is required, such as a periodic user activity update, the user connection intended to a local virtual machine at virtualization server 105 at site 21a from client computer 1010 is intercepted by synchronization computer 221 at site 21a. The packets of the user connection are opened and copied (step 817) by synchronization computer 221 at site 21a. In step 819, the data packets of the original connection are forwarded to the local virtual machine at virtualization server 105. By performing link translation (step 807), or by using a suitable tunneling protocol, copies of the user connection to the local virtual machine are directed to the synchronization computers 221 respectively situated at backup sites 21b and 21c. Synchronization computers 221 at backup sites 21b and 21c receive the redirected connections and open the packets, perform the update (step 809) of virtualization information and return an acknowledgment (step 813) received by synchronization computer at site 21a. According to an embodiment of the present invention, synchronization computer 221 located at site 21a, "spoofs" as a user, of virtualization machines at sites 21b and 21e, the spoofed user copying the activities of the user of virtual machine at 21a. The spoofed connection is received directly by virtualization servers 105 at sites 21b and/or 21c.

Sites 21, according to embodiments of the present invention are preferably secured using any network security components known in the art including communications using SSL VPN, network intrusion detection against Spy ware, Phishing/harming, viruses, worms, and Trojans for instance from Finjan Inc. (San Jose, Calif., USA). Sites 21 are preferably further equipped with an WAN (WX/WXC) Application Acceleration Platforms such as WX 60 and/or a Data Center (DX) Application Acceleration Platforms both of Juniper Networks Inc.

While the invention has been described with respect to a limited number of embodiments, it will be appreciated that many variations, modifications and other applications of the invention may be made.

What is claimed is:

1. In a wide area network including at least one workstation computer, at least one client running a client application, a plurality of nodes, each node having at least three sites, each site having a virtualization server, a storage device, a gateway computer and a synchronization computer, wherein the gateway computer and the synchronization computer are operatively connected, performing a method comprising the steps of:

maintaining, by a first virtualization server, in real time, virtualization information on the at least one workstation on a first storage device, the first virtualization server and the first storage device being located in a first site within a first node;

logging in, from the client application, to a first gateway application being run on a first gateway computer located within the first site;

in response to the client application logging in to the first gateway application, operatively connecting the client application to a first virtualization server located in the first site, wherein the virtualization server uses the virtualization information of the at least one workstation to provide a virtualization session to the client;

maintaining, at a second site within the first node, in real time a copy of the virtualization information of said at least one workstation computer on a second storage device at said second site, wherein the maintaining is performed by a first synchronization computer at the first site communicating with a second synchronization computer at the second site, wherein the communicating goes through said first and second gateway computers which are respectively operatively connected to said first and second synchronization computers;

determining the number of sites within the first node that are available and properly updated for virtualization of the at least one workstation;

upon the determination that there are only two sites available and properly updated for virtualization of the at least one workstation in the first node, finding, by the first gateway application, an alternate site within the first node;

in response to finding an alternate site in the third node, copying the virtualization information to of said at least one workstation computer to an alternate storage device at said alternate site;

upon the determination that there is only one site available and properly updated for virtualization of the at least one workstation in the first node, finding, by the first gateway application, a second node with at least three sites;

in response to finding the second node, copying the virtualization information of said at least one workstation computer to three sites within the second node;

monitoring for a communications failure between said first site and said second site, said communications failure causing at least one discrepancy between the virtualization information maintained on the first storage device and said copy maintained by the second storage device;

upon detecting the communications failure in said first site and the at least one discrepancy in said virtualization information maintained by the first and second storage devices, switching said client application to operatively connect to said second virtualization server at said second site, whereby said second virtualization server continuing said virtualization session using said copy of the virtualization information; and upon said detecting said communications failure in said first site:

seeking a third storage device at a third site that includes a third gateway computer operatively connecting the wide area network to a third synchronization computer, and upon finding said third storage device at said third site, activating a third virtualization server by copying the virtualization information to said third storage device at said third site.

2. The method, according to claim 1, wherein said maintaining is performed by intercommunicating between said first synchronization computer and said second synchronization computer.

3. The method, according to claim 1, wherein a client application runs in a client computer connected to the wide area network, wherein said client application is operatively attached to said first virtualization server which provides a virtualization session of said at least one workstation computer to a user of said client computer, wherein said intercommunicating includes updating said copy based on user activity by intercepting a connection of said virtualization sessions reading update information from said connection and redirecting said update information to said second site.

4. The method, according to claim 1, wherein a client application runs in a client computer connected to the wide area network, wherein said client application is operatively attached to said first virtualization server which provides a virtualization session of said at least one workstation computer to a user of said client computer, wherein said intercommunicating includes updating said copy based solely on user activity by copying solely a portion of the virtualization information stored on the first storage device to said copy stored on said second storage device.

5. The method, according to claim 1, wherein a client application runs in a client computer connected to the wide area network, wherein said client application is operatively attached to said first virtualization server which provides a virtualization session of said at least one workstation computer to a user of said client computer, wherein said intercommunicating includes spoofing a user of said client applications and based on activity of said user.

6. The method, according to claim 1, farther comprising the step of, prior to said monitoring:

logging in by a user of said client application with selectably either said first and said second gateway applications, wherein said logging in to said first gateway application operatively connects said client application to said first virtualization server and wherein said logging in to said second gateway application operatively connects said client application to said second virtualization server.

* * * * *

UNITED STATES PATENT AND TRADEMARK OFFICE
CERTIFICATE OF CORRECTION

| | | |
|---|---|---|
| PATENT NO. | : 7,975,024 B2 | Page 1 of 1 |
| APPLICATION NO. | : 11/674837 | |
| DATED | : July 5, 2011 | |
| INVENTOR(S) | : Yakov Nudler | |

It is certified that error appears in the above-identified patent and that said Letters Patent is hereby corrected as shown below:

In the Claims:

Column 10

Claim 1 line 11 should be corrected as follows:
Change
-- one site, whereby said second --
to
"one site, said second"

Signed and Sealed this
Twenty-third Day of August, 2011

David J. Kappos
*Director of the United States Patent and Trademark Office*